United States Patent [19]

Kampf et al.

[11] 4,344,102

[45] Aug. 10, 1982

[54] ANTI-TELEGRAPH CONTROL CIRCUIT FOR ELECTROMAGNET COIL

[75] Inventors: Julian C. Kampf, Grafton; James T. Libert, Waukesha; Winfred R. Lemke, Mequon, all of Wis.

[73] Assignee: Square D Company, Palatine, Ill.

[21] Appl. No.: 188,407

[22] Filed: Sep. 18, 1980

[51] Int. Cl.[3] ....................... F16K 17/36; H01H 47/32

[52] U.S. Cl. .................................................. 361/154

[58] Field of Search .............................. 361/154, 155

[56] References Cited

U.S. PATENT DOCUMENTS

| | | | |
|---|---|---|---|
| 3,790,862 | 2/1974 | Kampf et al. . | |
| 3,909,681 | 9/1975 | Campari et al. | 361/154 |
| 4,263,928 | 4/1981 | Kobayashi et al. | 361/154 |

*Primary Examiner*—J. D. Miller
*Assistant Examiner*—L. C. Schroeder
*Attorney, Agent, or Firm*—Michael J. Femal

[57] ABSTRACT

An anti-telegraph circuit for locking out the circuit controlling the flow of direct current in a coil winding of an electromagnetically operated switching device, such as a contactor, from an alternating current source whenever improper control voltages are present which would cause repeated operations of the armature picking up and falling out of its sealed position.

2 Claims, 1 Drawing Figure

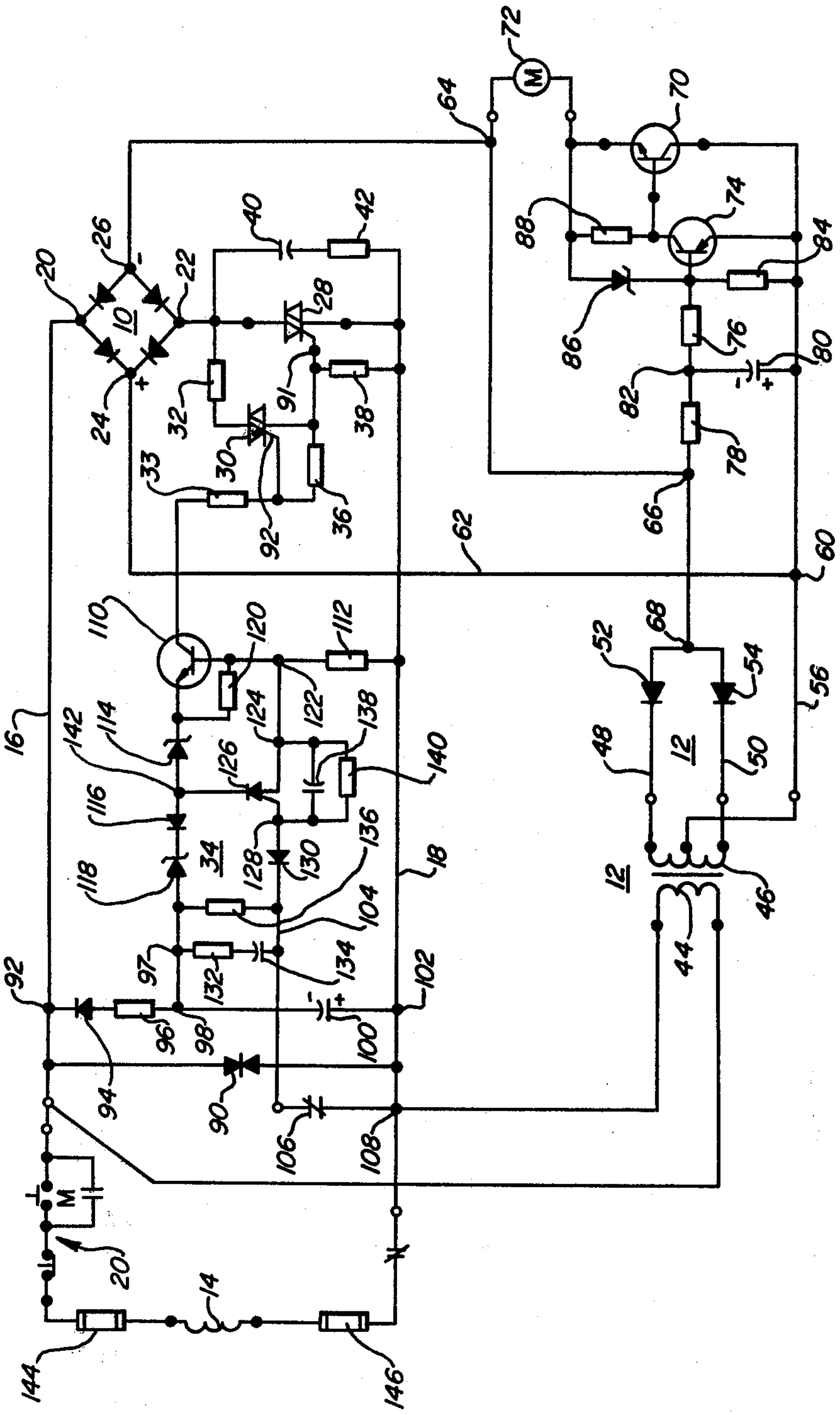

ANTI-TELEGRAPH CONTROL CIRCUIT FOR ELECTROMAGNET COIL

DESCRIPTION OF THE INVENTION

This invention relates to an anti-telegraph control circuit for an electromagnetically operated switching device and, more particularly, to a circuit that prevents the re-energization of the magnet in the device whenever inappropriate control voltage occurs.

Control circuits for the energization of the device, such as a contactor, with which the present invention is concerned are disclosed in U.S. Pat. No. 3,790,862, which was granted to the inventors, Julian C. Kampf et al, Feb. 4, 1974. The excitation control circuitry for operation of the contactor of the present invention is like the control circuitry of the '862 patent and operates in a similar manner and reference is herein made to those portions of the circuitry which operates in a similar manner.

In accordance with the present invention, a circuit for controlling the flow of direct current in a coil winding of a contactor from an alternating current source includes a high voltage circuit for armature pick-up and a low voltage circuit for maintaining the armature in a sealed position with the magnet in which a lockout circuit is connected to the switching control of the high voltage circuit so that if the low voltage is lost then the high voltage pick-up circuit will not be re-energized and continue to repeat pick-up thereafter.

It is an object of the present invention to provide an anti-telegraphing circuit for preventing the re-energization of a device having an electromagnet coil whenever the control voltage networks lack the proper voltage thereto to keep the device in its energized state.

Further objects and features of the invention will be readily apparent to those skilled in the art from the specification and appended drawing illustrating a preferred embodiment in which a schematic diagram of an anti-telegraph circuit controlling the energization of a coil winding in a contactor according to the present invention is shown.

The excitation control circuit for the electromagnetic coil, as shown on the drawing, includes a transformer 1T, a transformer 2T, a full wave rectifier bridge network 10 and a full wave rectifier bridge network 12. Transformer 1T has a primary winding not shown and a secondary winding 14 supplying alternating current to a pair of leads 16 and 18 through a conventional start-stop circuit 20 operating in a well known manner. Secondary transformer 1T supplies 120 volts AC to the power excitation circuit. The rectifier bridge 10 includes a pair of input terminals 20 and 22, a pair of output terminals 24 and 26, and diodes polarized so that the output terminal 24 is positive relative to the terminal 26 when the bridge 10 is energized with the alternating current of 120 volts at its input terminals 20 and 22. The terminal 20 is connected to lead 16 and the terminal 22 is connected through a triac 28 to lead 18, and gate G connected to a main terminal of a traic 30. The triac 30 includes another main terminal connecting through a resistor 32 to the terminal 22 and a gate G2 connecting through a resistor 33 to an anti-telegraph circuit 34 to be described in greater detail later. A resistor 36 is connected between the gate G2 and a main terminal of triac 30 and a resistor 38 is connected between the gate G1 of triac 28 and its other main terminal connected to lead 18. A capacitor 40 and a resistor 42 are connected in series between the main terminals of triac 28.

The transformer 2T includes a primary winding 44 attached across leads 16 and 18 and a secondary 46 connected to leads 48 and 50 having rectifiers 52 and 54 connected thereto, respectively, and further rectifiers 52 and 54 form a full wave rectification scheme with a center-tapped transformer winding lead 56. Lead 56 includes a junction 60 having a lead 62 connecting center-tapped lead 56 to the output junction 24 of the full wave bridge 10.

The positive outputs of rectifiers 10 and 12 are connected via the common lead 62, and the negative outputs of rectifiers 10 and 12 are connected together by a series circuit that includes a junction 64, a junction 66 and a junction 68. The diodes 52 and 54 are polarized to block current from the junction 68 from the output terminal 26. A transistor 70 and an electromagnetic coil 72 having an armature operating at least one set of contacts (as shown in the '862 patent) are connected in series between the junction 64 and the lead 56. Transistor 70 is of the NPN type and has an emitter connected through the coil 72 to the junction 64, and a collector connected to lead 56, and a base connected to the collector of a PNP type transistor 74. The transistor 74 of the PNP type has an emitter connected to the collector of the transistor 70 and a base connected through series connected resistors 76 and 78 to the junction 66. Capacitor 80 is connected between the lead 56 and a junction 82 located between the resistors 76 and 78. A resistor 84 is located between the base of transistor 74 and the lead 56. A Zener diode 86 is connected between the base of the transistor 74 and emitter of the transistor 70. In addition, a resistor 88 is connected between the collector of transistor 74 and the emitter of transistor 70.

Connected between leads 16 and 18 and controlling the gate current to triac 30 is the anti-telegraph circuit 34. Across the leads 16 and 18 and protecting the anti-telegraph circuit 34 against transients is an MOV 90. The anti-telegraph circuit 34 is connected between lines 16 and 18 via a series circuit having a junction 92 connected to lead 16, a rectifier 94, a resistor 96, a junction 98, a capacitor 100, and a junction 102 connected to the lead 18. The diode 94 is polarized so that the capacitor 100 charges in a plus-to-minus configuration between feed lines 18 and 16, respectively. A series lead 104 in the anti-telegraph circuit is connected through a normally closed contact 106 to a junction 108 connected to the lead 18. The resistor 33 of the triac circuits is connected to a collector of a transistor 110 of the anti-telegraph circuit 34. The base of transistor 110 is connected through a resistor 112 to the lead 18. The emitter of the transistor 110 is connected through a series circuit to the junction 98 having a blocking Zener diode 114, a diode 116 and blocking another Zener diode 118. The base of transistor 110 is connected to the emitter thereof via a resistor 120. The base of transistor 110 is connected to the lead 104 via a junction 122. A junction 124 on lead 104 is connected to one input of a programmable unijunction transistor 126, a second terminal or gate of the unijunction transistor 126 is attached to a junction 128 and a blocking diode 130. Connected at a junction 97 between the junction 98 and the Zener diode 118 is a series circuit having a resistor 132 and a capacitor 134 with its other end connected to the lead line 104. Also connected between the series circuit on the emitter side of transistor 110 and lead line 104 is a resistor 136. Connected in parallel across terminals 124 and 128 of the programmable unijunction transistor 126 is a capacitor 138 and a resistor 140. The output of the programmable unijunction transistor 126 is connected to the series circuit on the emitter side of transistor 110 between Zener diode 114 and diode 116 at a junction 142.

To add further protection to the control circuit for the electromagnetic coil are fuses 1 and 2 connected in series between the output terminal of the secondary winding 14 of the transformer 1T and the leads 16 and 18, respectively.

In operation, an operator pushes the normally open contacts of the stop-start circuit 20 which allows transformer 1T to supply 120 volts AC to power the excitation circuit. Upon initiation of the excitation circuit, capacitor 100 in the anti-telegraph circuit is charged to approximately 100 volts through resistor 96 and rectifier 94. Resistor 96 limits the charging current through capacitor 100. While capacitor 100 is charging, a capacitor 4C is also charging through the contact 106, a normally closed contact connected between lead 104 and junction 108. The voltage on capacitor 100, which is approximately 100 volts, turns on the transistor 110 through the resistor 112, and collector current then pulled by transistor 110 goes through the two gates G1 and G2 of triacs 28 and 30, respectively, via resistor 32 to the collector of the transistor 110. The transistor 110 turns on the triac 30 which fires into triac 28, an amplified current to gate G1 of triac 28. Triac 28 then connects the full wave bridge 10 across the transformer 1T, which pulls heavy current through the coil 72. During this time, the transformer 1T is sagging and the heavy current flow continues for as long as it takes to energize the magnet which, in turn, opens an interlock. The interlock is the contact 106, referred to earlier, connected between terminal 108 and feed line 104. When this interlock contact opens because enough current has passed through the coil 72 to seal the armature against the magnet in the contactor, the capacitor 134 now begins discharging through resistors 132 and 136. Capacitor 134 had been at approximately 100 volts like capacitor 100. This 100-volt potential of capacitor 134 causes a reverse biasing of rectifier 130 which kept the gate side off on the programmable unijunction transistor 126. But now that the interlock 106 is open, capacitor 134 discharges through resistors 132 and 136 to a lower potential. When the capacitor 134 reaches a potential of approximately 25 volts, then rectifier 130 becomes forward biased, pulling gate current from the programmable unijunction transistor 126 which then turns on. The turn on of the programmable unijunction transistor 126 and its low resultant forward voltage then effectively shorts the base drive for transistor 110. The transistor 110 turns off and, in turn, cuts off gate current to triacs 28 and 30 of the high voltage and high current rectifying circuit 10. The programmable unijunction transistor 126, once being turned on, then stays on and it is latched up until the power to the contactor control circuit is removed.

All of the time the electromagnetic coil 72 of the contactor is energized, the capacitor 100 still has voltage on it. Current continues flowing through resistor 112 albeit it now goes through the programmable unijunction transistor 126 instead of through the base of transistor 110 which is now cut off and unijunction transistor 126 stays in a latched position. This is the anti-telegraph feature, i.e., the voltage to the excitation control circuit for electromagnetic coil 72 must be removed so that the programmable unijunction transistor 126 turns off before you can ever re-energize the high voltage circuit 10 to pick-up the armature and seal it against the magnet if for any reason control voltage is lost and the contactor opens.

Typically, telegraphing usually occurs when the low voltage circuit 12 which supplies maintaining current to the contactor in its sealed position is lost. Without the anti-telegraph circuit, the high voltage circuit 10 would re-energize coil 72 causing the armature to pick-up again and then drop out when the high voltage circuit times out and the low voltage circuit fails to maintain the armature in its sealed position with the magnet and then repeating the process. For example, the control circuit of the '862 patent would remove the high voltage and, if the low voltage circuit 11 lacked a sufficient potential, then the armature would drop out from the sealed position with the magnet and the high voltage would come back on re-energizing the electromagnetic coil C and picking up the armature again from its dropped out position. However, if the voltage which is supplied by transformer 2T is not present, the armature will simply pick-up once, drop out once and stay dropped out when the anti-telegraphing circuit of the present invention is used.

Referring back to this timing when capacitor 134 discharges, the purpose of that timing period, which is about four to five cycles, is to assure that the magnet is sealed after the interlock 106 opens. The interlock 106 usually opens ahead of a good seal of the armature against the magnet, so a little more time of high voltage assures that the magnet properly seals. After the electromagnetic devices are energized and the aramture is sealed against the magnet, the high voltage is usually removed and power continues to be supplied to the coil through the lower voltage circuit from rectifier 12. The lower voltage being supplied by transformer 2T is rectified full wave by diodes 52 and 54, as previously described. This lower voltage circuit charges capacitor 80 which supplies current to transistor 74. The collector current of transistor 74 feeds into the base of transistor 70 and turns it on. Transistor 70 then supplies current at this lower voltage to the coil 72 to maintain the armature in its sealed position with the magnet. Current passes from the center-tapped lead 56 of transformer 2T through lead 56, transistor 70, through electromagnetic coil 72 to junction 64 and back to junction 66 and 68 of the full wave rectifier 12 to leads 48 and 50 connected to the secondary winding of transformer 2T. After the electromagnetic coil is de-energized, current continues to flow for a short time in the coil 72 because of its inductive nature. The current flows through the coil into terminal F going through the bridge 10 or through diodes 52 and 54 of the low voltage rectifier 12.

After a short period of time, capacitor 80 discharges and it can no longer turn on the transistor 74. Therefore, the inductive current of electromagnetic coil 72 now has to turn on transistor 74 by overcoming Zener diode 86. The voltage across transistor 70 then essentially matches Zener diode 86, which is about 20 volts. The inductive current in the coil is now pushing, not through a diode drop, but through 20 volts, and this brings about a much quicker decay of the current in the electromagnetic device and also a quicker drop out of the magnet. The reason for the transistors and Zener diode 86 is to make a faster drop out of the armature in the magnet of the contactor.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. A circuit for controlling the energization of an electromagnetically operated device having a stationary magnet, an armature and a coil positioned to induce magnetic flux in the magnet and armature for causing the armature to move from a first position where the armature is spaced from the magnet to a second position where the armature engages the magnet when the coil is energized by a direct current, said circuit comprising:

an alternating current source;

a pair of circuits connected between said source and coil for providing a combined but unequal output of direct current to said coil for moving the armature from its first to second position, one of said circuits of lesser potential supplying sufficient direct current to only maintain the armature in its second position when the other circuit of greater potential is de-energized; and, means for switching out said other circuit responsive to the armature in its second position and for locking out said other circuit from re-energization so that, if the one circuit loses potential causing the armature to move back to its first position, the other circuit remains de-energized and unable to move the armature back to its second position.

2. The circuit of claim 1 wherein the switching and locking out means include a gated semiconductor device for connecting said other circuit across said source, a transistor having a collector circuit connected to the gate of said device for driving the gate of said device and turning it on whenever a base current is applied, a programmable unijunction semiconductor turned on after the armature is sealed in its second position and having an input connected to the base of said transistor for shorting out the base drive current of said transistor which removes the gate current to said device and latches said transistor in a non-conductive state until the source is removed from said pair of circuits.

* * * * *